United States Patent
Lilie et al.

(10) Patent No.: US 8,549,988 B2
(45) Date of Patent: Oct. 8, 2013

(54) MOUNTING ARRANGEMENT FOR THE PISTON OF A RECIPROCATING HERMETIC COMPRESSOR

(75) Inventors: Dietmar Erich Bernhard Lilie, Joinville (BR); Fabio Henrique Klein, Joinville (BR); Fabricio Caldeira Possamai, Joinville (BR); Hugo Renato Seibel, Joinville (BR); Ivan da Costa Pereira Filho, Joinville (BR); Marcio Luiz Todescat, Joinville (BR)

(73) Assignee: Whirlpool S.A., São Paulo-Sp (BR)

( * ) Notice: Subject to any disclaimer, the term of this patent is extended or adjusted under 35 U.S.C. 154(b) by 0 days.

(21) Appl. No.: 10/484,822

(22) PCT Filed: Jul. 24, 2002

(86) PCT No.: PCT/BR02/00103
§ 371 (c)(1),
(2), (4) Date: Jul. 27, 2004

(87) PCT Pub. No.: WO03/010446
PCT Pub. Date: Feb. 6, 2003

(65) Prior Publication Data
US 2004/0261613 A1 Dec. 30, 2004

(30) Foreign Application Priority Data
Jul. 25, 2001 (BR) .................................. 0104001

(51) Int. Cl.
*F16J 1/18* (2006.01)
(52) U.S. Cl.
USPC .......................................................... 92/187

(58) Field of Classification Search
USPC .......................................... 92/187, 162 R, 175
See application file for complete search history.

(56) References Cited

U.S. PATENT DOCUMENTS

| 1,285,755 | A | * | 11/1918 | McCuen | 92/187 |
| 1,591,343 | A | | 7/1926 | Redfield | |
| 2,422,327 | A | | 6/1947 | Winslow | |
| 2,703,264 | A | * | 3/1955 | Pitner | 92/187 |
| 3,574,293 | A | * | 4/1971 | Vriend | 92/187 |
| 3,757,581 | A | * | 9/1973 | Mankin et al. | 92/72 |
| 4,050,360 | A | * | 9/1977 | Powers et al. | 92/187 |
| 4,124,978 | A | * | 11/1978 | Wagner | 92/162 R |
| 4,574,591 | A | | 3/1986 | Bertsch | |

(Continued)

FOREIGN PATENT DOCUMENTS

| DE | 27 57 570 A1 | 6/1979 |
| DE | 195 22 210 C1 | 1/1997 |

(Continued)

*Primary Examiner* — F. Daniel Lopez
(74) *Attorney, Agent, or Firm* — Gifford, Krass, Sprinkle, Anderson & Citkowski, P.C.

(57) ABSTRACT

A mounting arrangement for the piston of a reciprocating hermetic compressor, comprising: a cylinder (1), inside which is defined a compression chamber (C); and a piston (10) provided with a pair of radial holes (11), each lodging and retaining one end of a pin (20), to which is coupled a driving mechanism of the compressor to reciprocate the piston (10) inside the cylinder (1), said radial holes (11) being completely sealed in relation to the radial gaps (15) of the bearing surfaces (10*a*, 10*b*) of the piston (10), so that both radial gaps (15) operate as means for restraining the leakage of refrigerant gas outwardly and inwardly in relation to the compression chamber (C).

8 Claims, 3 Drawing Sheets

(56) References Cited

U.S. PATENT DOCUMENTS 5,403,170 A * 4/1995 Bianchi et al. .................. 92/187
5,421,245 A * 6/1995 Christoffel et al. ............. 92/187
5,850,777 A * 12/1998 Marklin et al. ................. 92/187

FOREIGN PATENT DOCUMENTS

| FR | 1 144 413 A1 | 10/1957 |
| GB | 954003 A1 | 4/1964 |
| GB | 1 577 352 A1 | 10/1980 |

* cited by examiner

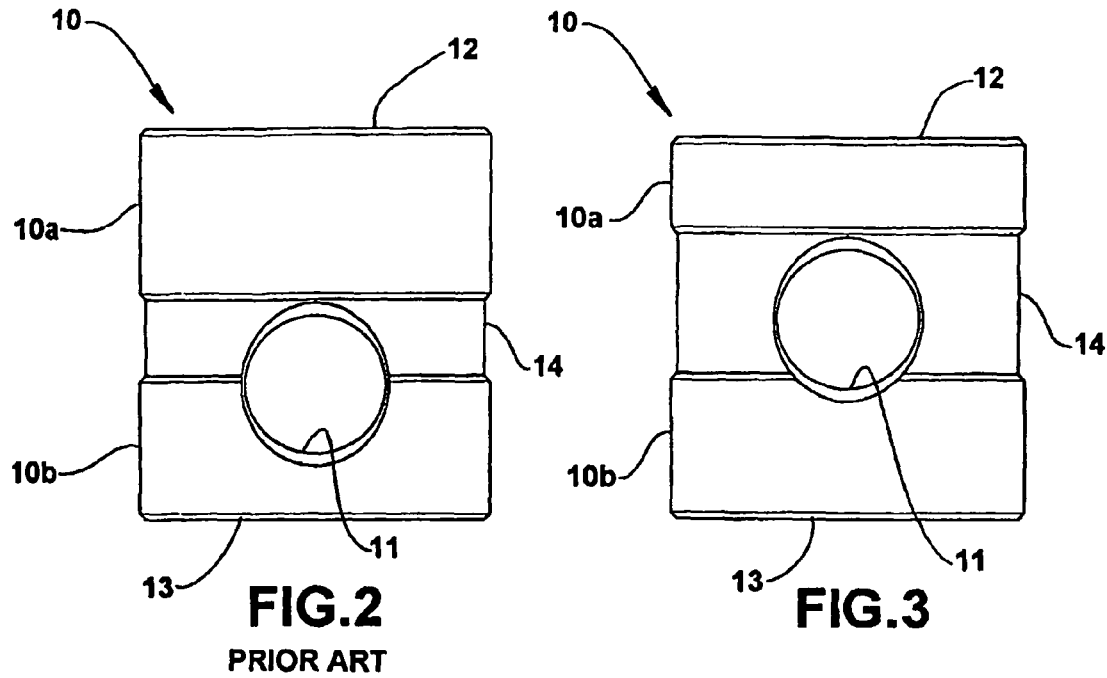
FIG.2 PRIOR ART
FIG.3
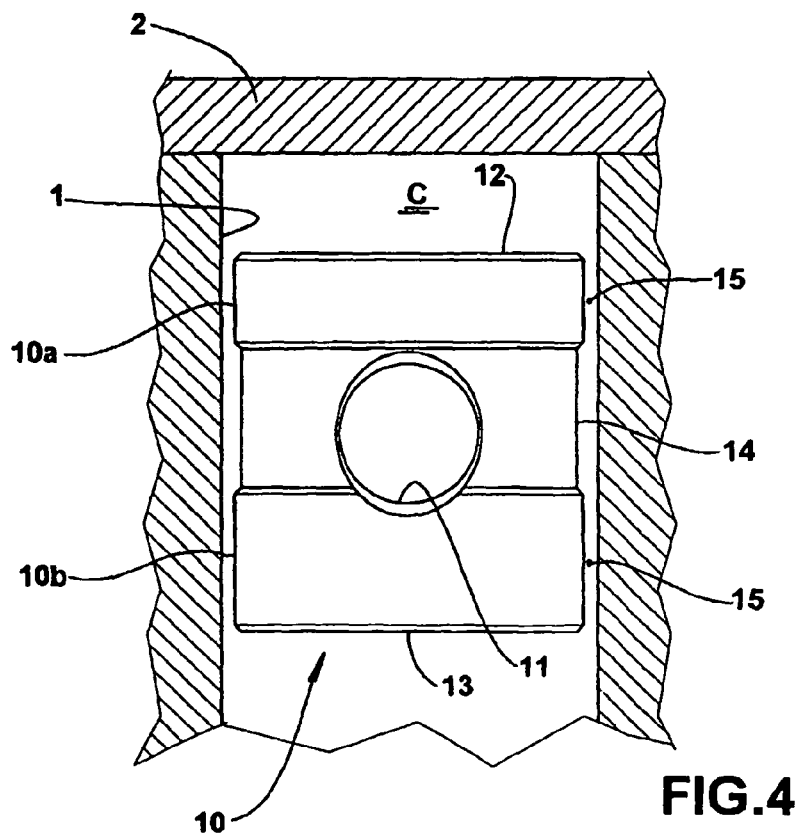
FIG.4

MOUNTING ARRANGEMENT FOR THE PISTON OF A RECIPROCATING HERMETIC COMPRESSOR

FIELD OF THE INVENTION

The present invention refers generally to a mounting arrangement for the piston of a reciprocating hermetic compressor of the type used in small refrigeration appliances and, more particularly, to a mounting arrangement for the pin that articulates the connecting rod in the pair of opposite radial holes medianly provided in the piston.

BACKGROUND OF THE INVENTION

In the reciprocating hermetic compressors operated by a piston and normally used in small refrigeration systems or appliances, the compression of the refrigerant gas is obtained by the reciprocating movement of the piston inside a cylinder, between the displacement limits determined by the driving mechanism known as the lower dead point and the higher dead point. The cylinder has an open end, and an opposite end closed by a valve plate that defines one of the ends of a compression chamber, which other end is defined by the piston top.

In order that the movement of the piston inside the cylinder occurs in an adequate manner, it is necessary to provide a radial gap between the piston of smaller diameter and the cylinder of larger diameter.

During the operation of the compressor, said radial gap is partially filled with lubricant oil, bearing the piston and preventing wear between the movable parts. This bearing leads to a dissipation of mechanical energy, in order to overcome the viscous friction produced by the oil and by the movement of the piston.

When the piston is displaced from the lower dead point to the higher dead point, the refrigerant gas is compressed in the compression chamber, increasing its pressure in relation to the pressure of the gas existing inside the shell of the compressor, and causing a pressure differential that tends to produce leakage inside the shell, through the radial gap, of part of the refrigerant gas being compressed in the compression chamber. This phenomenon characterizes a volumetric loss and reduces the refrigeration capacity of the compressor, since the leakage causes a compression operation to be performed on a certain quantity of refrigerant gas that is directed to the inside of the shell. This loss directly reduces the energetic efficiency of the compressor.

The bearing of the piston, as well as the leakage of the compressed gas are functions mainly of the diameters and lengths of the cylinder and piston, of the distance traveled by the piston, of the rotational speed of the driving shaft, of the geometry of the driving mechanism, of the type of refrigerant gas used, of the type of lubricant oil, and of the operational conditions of the compressor (pressures and temperatures).

The piston is connected to the driving mechanism, which generally comprises a connecting rod, by means of a pin having opposite ends lodged and retained in a pair of diametrically opposite radial holes provided in the median region of the piston. The assembly of the pin to the radial holes of the piston is made, so that these two opposite regions represent a restriction to the flow of refrigerant gas that leaks by the radial gap existing between the cylinder and a piston top bearing surface, which is defined between the piston top and a transversal plane containing the pin axis, said restriction being smaller than the restriction to said flow of refrigerant gas imposed by the radial gap existing between the cylinder and the piston bottom bearing surface defined between the bottom of the piston and said transversal plane. Thus, in the known assemblies, the refrigerant gas tends to leak by the radial gap from the top of the piston to the inside thereof, through median radial holes of the piston. Thus, only the piston top bearing surface has also the function of restricting the leakage of gas through the radial gap, mainly during the compression cycle, since in the suction cycle the reverse leakage that may occur can be ignored, besides being considered positive in terms of volumetric efficiency of the compressor. However, the piston bottom bearing surface, which is defined between the bottom of the piston and the pin, and which does not have a restrictive function against the leakage of refrigerant gas, leads to power dissipation by viscous friction.

The high efficiency compressors have an external circumferential recess in the median region of the piston, in which the radial holes are provided for mounting the pin, separating the above mentioned top and bottom bearing surfaces. This artifice is used to reduce the power dissipated in the bearing of the piston, without increasing the leakage of refrigerant gas by the radial gap, since the axial extension of the piston top bearing surface is maintained at a minimum value that is required to assure a determined restriction to the flow of refrigerant gas through the radial gap in this region. The piston bottom bearing surface is maintained to guide the piston, producing viscous friction and having no positive effect considered relevant to restrict the leakage of refrigerant gas.

OBJECT OF THE INVENTION

The object of the present invention is to provide a mounting arrangement of the type considered herein, which presents a smaller overall bearing surface, in order to reduce the power dissipation in the piston, without causing any decrease in the capacity of restricting the leakage of refrigerant gas by the radial gap defined between the piston and the cylinder.

SUMMARY OF THE INVENTION

The above object is achieved by providing a mounting arrangement for the piston of a reciprocating hermetic compressor of the type comprising a cylinder, inside which is defined a compression chamber; and a piston provided with a pair of radial holes, each lodging and retaining one end of a pin, to which is coupled a driving mechanism of the compressor to reciprocate the piston inside the cylinder, varying the volume of the compression chamber, with the piston presenting, on each of the sides of a transversal plane containing the axis of the pin, a bearing surface maintaining a radial gap with the cylinder.

According to the invention, the radial holes are completely sealed in relation to the radial gaps of the bearing surfaces, so that both radial gaps operate, together and as a function of their respective axial extensions, as means for restraining the leakage of refrigerant gas outwardly and inwardly in relation to the compression chamber.

The constructive conception proposed herein provides the complete sealing of the joint between the ends of the pin and the piston, that is, the complete sealing of the two radial holes of the piston, in order to eliminate the leakage of refrigerant gas through said radial holes and to allow the radial gap, between the piston bottom bearing surface and the cylinder, to operate also as a means for restraining the leakage of refrigerant gas through said gap.

The proposed technical solution allows using a smaller axial extension for the bearing surface, which can reduce the total length of the piston, or reduce the axial extension of the piston top bearing surface, in case the piston is provided with an external circumferential recess in its median region. Reduction of the total axial extension of the piston bearing surface reduces the area of viscous friction and, consequently, the power dissipation in the piston.

BRIEF DESCRIPTION OF THE DRAWINGS

The invention will be described below, with reference to the enclosed drawings, in which:

FIGS. 2-3 is an enlarged lateral view of a piston with the mounting arrangement of the prior art, and a piston with the mounting arrangement of the present invention, respectively;

FIG. 4 is a lateral view of the piston of FIG. 3, but mounted inside a cut and partially shown cylinder.

DESCRIPTION OF THE ILLUSTRATED EMBODIMENTS

Figure 1:
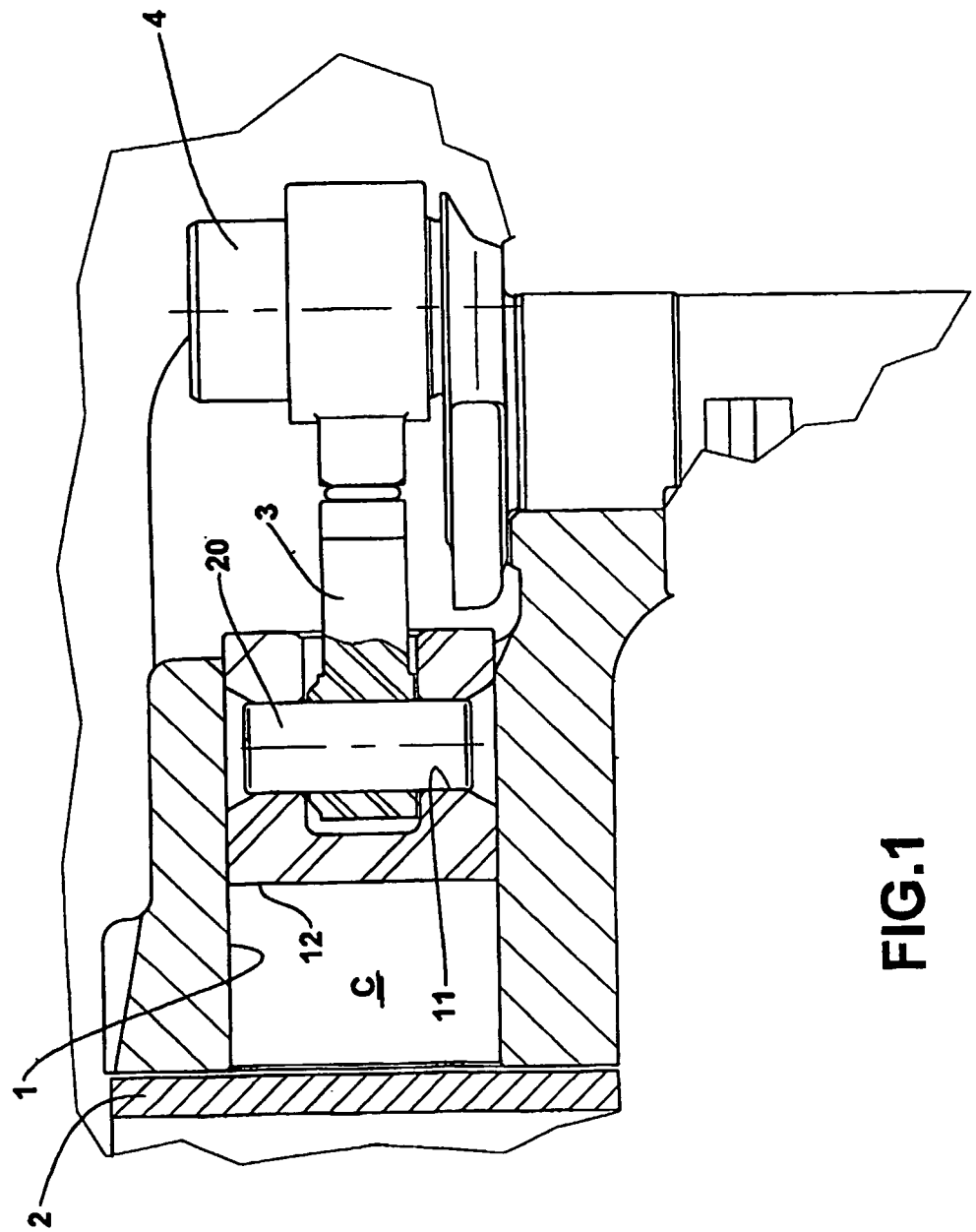
FIG. 1 illustrates, schematically, a sectional view of a cylinder-piston assembly for a reciprocating hermetic compressor used in the present invention.

As illustrated in FIG. 1, the present mounting arrangement is applied to the piston of a reciprocating hermetic compressor of the type comprising a cylinder 1, with an open end, and with the opposite end generally closed by a valve plate 2, inside the cylinder being mounted a piston 10 that defines, with the closed end of the cylinder 1, a compression chamber C.

Piston 10 is provided, in the median region thereof, with a pair of radial holes 11, which are diametrically opposite, each lodging and retaining one end of a pin 20, to which is coupled a driving mechanism of the compressor to reciprocate the piston 10 inside the cylinder 1, varying the volume of the compression chamber C. In the illustrated construction, the driving mechanism is defined by a connecting rod 3 with a smaller eye mounted around the pin 20, and with a larger eye mounted to the eccentric of the shaft 4 of the compressor.

As it can be noted by FIG. 2, the piston 10, which is constructed to receive the prior art mounting arrangement, presents a piston top bearing surface 10a, disposed between the top 12 of the piston 10 and a transversal plane containing the axis of the pin 20, and a piston bottom bearing surface 10b, disposed between said transversal plane and the bottom 13 of the piston 10.

In the exemplary construction illustrated in FIGS. 2-4, the piston 10 is further medianly provided with an external circumferential recess 14, separating the two bearing surfaces and to which are opened the radial holes 11. It should be understood that the present mounting arrangement might also be advantageously applied to a piston without the external circumferential recess 14.

According to the prior art mounting arrangement, the piston bottom bearing surface lob presents an axial extension that is defined solely by the bearing requirements of the piston 10 in its reciprocating displacement, since the radial gap 15 defined between this piston bottom bearing surface 10b and the cylinder 1 does not operate as a restraining or limiting means to the leakage of refrigerant gas outwardly and inwardly in relation to the compression chamber C. The refrigerant gas leaks between the interior and the exterior of the compression chamber C, through the gaps existing between the ends of the pin 20 and the respective radial holes 11 of the piston 10. Thus, only the radial gap 15 defined between the cylinder 1 and the piston top bearing surface 10a operates as a restraining means to the leakage of refrigerant gas, requiring that the axial extension of the piston top bearing surface 10a is sufficient to assure adequate sealing of the compression chamber C. Thus, the bearing of piston 10 is performed by the overall extension of the bearing surface, which is only partially used as a restraining means to the leakage of refrigerant gas, but integrally operating as a viscous friction generating means.

FIGS. 3-4 illustrate a piston 10, which is constructed as a function of the application of the mounting arrangement proposed herein. In this case, mounting the ends of piston 20 to the respective radial holes 11 of piston 10 is made so as to seal completely said radial holes 11. Therefore, in order to leak in relation to the compression chamber C, the refrigerant gas is forced to pass through the radial gap 15 throughout the length of the piston 10, that is, the radial gap 15 between the piston bottom bearing surface 10b and the cylinder 1 now also operates as a restraining means to the leakage of refrigerant gas.

With the new construction, the restriction to the leakage is now obtained by the radial gaps 15 related to both bearing surfaces, 10a and 10b, which can have their total extension reduced in order to reduce the viscous friction, and to assure a better sealing for the compression chamber C.

In case the piston 10 contains the external circumferential recess 14, the latter can have its axial extension increased toward the top 12 of the piston 10, diminishing the axial extension of the piston top bearing surface 10a, as it can be noted by comparing FIGS. 2 and 3.

In the absence of the external circumferential recess 14 and with a modification in the design being possible, the present mounting arrangement allows reducing the length of the piston 10 or increasing the gap 15.

The sealing of the radial holes 11 can be obtained by any adequate means such as, for example, those described below.

Figure 5:
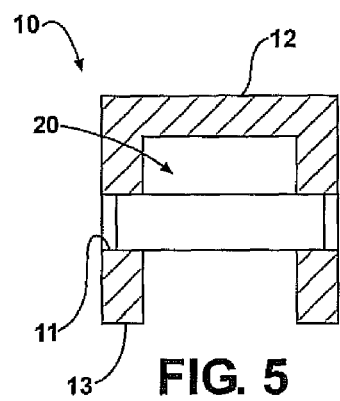
FIGS. 5, 6, 7, 8, 8a, and 9 show, schematically and in a diametrical sectional view, the piston with different constructive solutions for sealing the radial holes of the piston close to the respective ends of the pin.

In FIG. 5 there is shown a construction in which the sealing of both radial holes 11 of the piston 10 is obtained by mounting interference between each end of the pin 20 and the respective radial hole 11 in which it is lodged.

Figure 6:
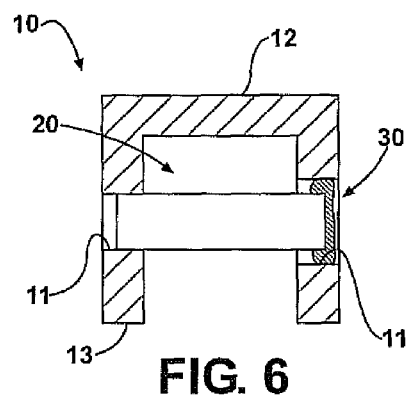

FIG. 6 illustrates a construction in which the sealing of one of the radial holes 11 of piston 10 is made by mounting interference with the respective end of pin 20, the sealing of the other radial hole 11 being obtained by a sealing element 30 which, in the example of FIG. 6, is defined by an adhesive applied between said radial hole 11 and the respective end of pin 20.

Figure 7:
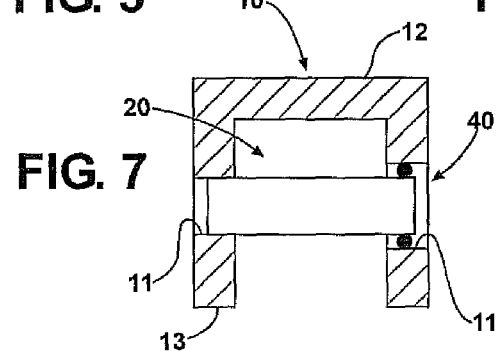

FIG. 7 illustrates a constructive variant for the arrangement of FIG. 6, according to which the sealing element 40 takes the form of an elastomeric sealing ring that is compressively mounted between the end of pin 20 and the respective radial hole 11 in which it is lodged.

Figure 8A:
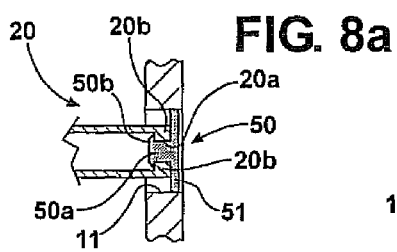
Figure 8:
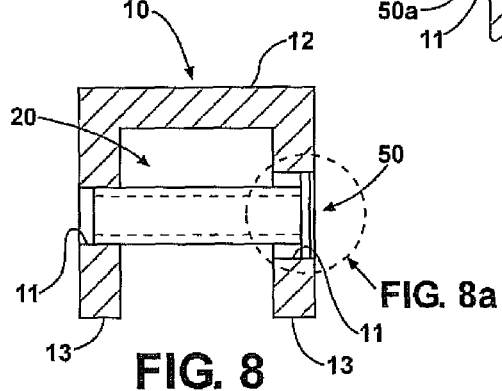

In FIG. 8 there is further illustrated a constructive variant of FIG. 6, according to which the sealing element 50 is defined by a clamp, which is axially fitted in an end axial hole of the pin 20 and has an end flange 51, which is peripherally and sealingly seated inside the respective radial hole 11, as better illustrated in FIG. 8a. The peripheral edge of the end flange 51 can be constructed to define a sealing means to be seated against the wall of the radial hole 11. As shown in FIG. 8a, an end of the pin includes an opening 20a defined by an inner peripheral wall 20b which extends inwardly and uniformly from a distal edge of the end of the pin 20. The clamp 50 includes a neck 50a which has a length generally the same as that of the length of the inner peripheral wall 20 b as measured by the longitudinal axis of the pin 20. The clamp further includes a lip 50 b which extends radially from a distal end of the neck 50 a. The lip 50 b is configured to pinch the inner peripheral wall 20 b of the pin 20 against a portion of the flange 51 so as to secure the clamp 50 to the pin 20.

Figure 9:
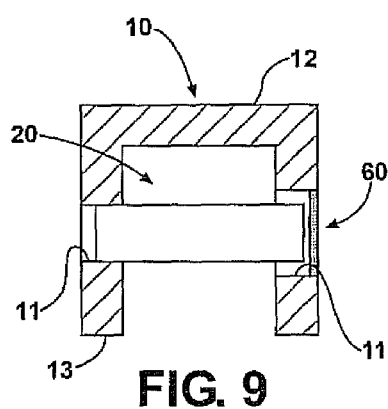

FIG. 9 illustrates one more constructive variant for the arrangement of FIG. 6, according to which the sealing element 60 is defined by a cover fitted and retained inside the radial hole 11 to be sealed externally to the adjacent end of the pin 20. It should be understood that the sealing elements 30, 40, 50 and 60 might be provided in both radial holes 11, when the pin 20 is slidingly and loosely fitted in both radial holes 11.

This pin 20, which is mounted without mounting interference, can use an elastic ring that actuates against the wall of both radial holes 11, in order to cause the axial retention of the pin 20 in the piston 10.

The constructive options described herein have been given by way of example only. The axial retention of the pin 20 and the sealing of the radial holes 11 may be obtained by other manners, without departing from the scope of protection defined by the appended claims.

The invention claimed is:

1. A mounting arrangement for the piston of a reciprocating hermetic compressor of the type comprising: a cylinder, with an opened end and an opposite end closed by a valve plate inside which is mounted a piston defining a compression chamber with the closed end of the cylinder;
   said piston provided with a pair of radial holes, each lodging and retaining one end of a pin, to which is coupled a driving mechanism of the compressor to reciprocate the piston inside the cylinder, varying the volume of the compression chamber;
   the piston further including two bearing surfaces, each of the bearing surfaces spaced apart from each other, each bearing surface maintaining a radial gap with the cylinder; and
   a clamp axially fitted into an end of the pin and having an end flange, which is peripherally and sealingly seated inside said radial hole, wherein the radial holes are completely sealed in relation to the radial gaps of the bearing surfaces, so that both radial gaps operate together and as a function of their respective axial extensions, as means for restraining the leakage of the refrigerant gas outwardly and inwardly in relation to the compression chamber.

2. The mounting arrangement, according to claim 1, characterized in that the peripheral edge of the end flange is seated against an inner peripheral wall defining the at least one radial hole.

3. The mounting arrangement, according to claim 1, characterized in that the clamp includes a neck adapted to sealingly engage an opening of an end of the pin.

4. The mounting arrangement, according to claim 3, characterized in that the one end of the pin includes a pin opening defined by an inner peripheral wall, the neck includes a lip extending radially from a distal end of the neck, the lip configured to pinch the inner peripheral wall of the pin against the flange so as to secure the clamp to the pin.

5. A mounting arrangement for the piston of a reciprocating hermetic compressor of the type comprising: a cylinder, with an opened end and an opposite end closed by a valve plate inside which is mounted a piston defining a compression chamber with the closed end of the cylinder;
   said piston provided with a pair of radial holes, each lodging and retaining one end of a pin, to which is coupled a driving mechanism of the compressor to reciprocate the piston inside the cylinder, varying the volume of the compression chamber;
   the piston further including two bearing surfaces, each of the two bearing surfaces spaced apart from each other, the bearing surface maintaining a radial gap with the cylinder,
   wherein the radial holes are completely sealed in relation to the radial gaps of the bearing surfaces, so that both radial gaps operate together and as a function of their respective axial extensions, as means for restraining the leakage of the refrigerant gas outwardly and inwardly in relation to the compression chamber, and so that to leak in relation to the compression chamber, the refrigerant gas is forced to pass through the radial gaps throughout a length of the piston,
   the sealing of at least one of the radial holes is obtained by a sealing element, mounted in said radial hole, and
   the sealing element is defined by a clamp axially fitted into an end of the pin and having an end flange, which is peripherally and sealingly seated inside said radial hole.

6. The mounting arrangement, according to claim 5, characterized in that the peripheral edge of the end flange is seated against an inner peripheral wall defining the at least one radial hole.

7. The mounting arrangement, according to claim 5, characterized in that the clamp includes a neck adapted to sealingly engage an opening of an end of the pin.

8. The mounting arrangement, according to claim 7, characterized in that the one end of the pin includes a pin opening defined by an inner peripheral wall, the neck includes a lip extending radially from a distal end of the neck, the lip configured to pinch the inner peripheral wall of the pin against the flange so as to secure the clamp to the pin.

* * * * *

UNITED STATES PATENT AND TRADEMARK OFFICE
CERTIFICATE OF CORRECTION

PATENT NO.         : 8,549,988 B2  
APPLICATION NO.    : 10/484822  
DATED              : October 8, 2013  
INVENTOR(S)        : Dietmar Erich Bernhard Lilie et al.

Page 1 of 1

It is certified that error appears in the above-identified patent and that said Letters Patent is hereby corrected as shown below:

In the Specification

Column 3, line number 61, the word "lob" should be "10b".

Column 4, line number 22, the word "lob" should be "10b".

Signed and Sealed this
Twenty-fourth Day of June, 2014

Michelle K. Lee
*Deputy Director of the United States Patent and Trademark Office*